United States Patent
Shin

(10) Patent No.: US 10,651,494 B2
(45) Date of Patent: May 12, 2020

(54) STACK MODULE FOR FUEL BATTERY AND HIGH TEMPERATURE ELECTROLYSIS INCLUDING INDIVIDUALLY CHANGEABLE CELL BATTERY MODULE DURING OPERATION

(71) Applicant: KOREA INSTITUTE OF CERAMIC ENGINEERING AND TECHNOLOGY, Jinju-si, Gyeongsangnam-do (KR)

(72) Inventor: Tae-Ho Shin, Jinju-si (KR)

(73) Assignee: KOREA INSTITUTE OF CERAMIC ENGINEERING AND TECHNOLOGY, Jinju-si, Gyeongsangnam-do (KR)

( * ) Notice: Subject to any disclaimer, the term of this patent is extended or adjusted under 35 U.S.C. 154(b) by 23 days.

(21) Appl. No.: 15/839,288

(22) Filed: Dec. 12, 2017

(65) Prior Publication Data

US 2018/0183086 A1    Jun. 28, 2018

(30) Foreign Application Priority Data

Dec. 27, 2016  (KR) .................. 10-2016-0180030
Oct. 18, 2017  (KR) .................. 10-2017-0135166

(51) Int. Cl.

| | | |
|---|---|---|
| *H01M 8/24* | (2016.01) | |
| *H01M 8/04* | (2016.01) | |
| *H01M 8/02* | (2016.01) | |
| *C25B 9/18* | (2006.01) | |
| *C25B 1/04* | (2006.01) | |
| *C25B 9/04* | (2006.01) | |
| *H01M 8/243* | (2016.01) | |

(Continued)

(52) U.S. Cl.
CPC ............ *H01M 8/243* (2013.01); *C25B 1/04* (2013.01); *C25B 9/04* (2013.01); *C25B 9/18* (2013.01); *H01M 8/0271* (2013.01); *H01M 8/04201* (2013.01); *H01M 8/2465* (2013.01); *Y02E 60/366* (2013.01)

(58) Field of Classification Search
CPC ... C25B 1/04; C25B 9/04; C25B 9/18; H01M 8/0271; H01M 8/04201; H01M 8/243; H01M 8/2465; Y02E 60/366
See application file for complete search history.

(56) References Cited

U.S. PATENT DOCUMENTS

2012/0015277 A1    1/2012  Kong et al.

FOREIGN PATENT DOCUMENTS

| JP | 2002231275 A | 8/2002 |
|---|---|---|
| JP | 2008-071712 A | 3/2008 |

(Continued)

OTHER PUBLICATIONS

Korean Office Action dated Apr. 26, 2019, in connection with the Korean Patent Application No. 10-2017-0135166.

*Primary Examiner* — Ciel P Thomas
(74) *Attorney, Agent, or Firm* — Hauptman Ham, LLP

(57) ABSTRACT

Disclosed is a stack module for a fuel cell and high temperature electrolysis including an individually changeable cell battery module during operation, the stack module being designed to be able to individually separate, couple, or replace a plurality of cell battery modules by a one-touch manner during operation so that maintenance costs are low, and, even when one or more cell battery modules are separated from a fuel transfer panel, other cell battery modules can operate normally such that superior power generation efficiency can be achieved.

17 Claims, 14 Drawing Sheets

(51) Int. Cl.
*H01M 8/04082* (2016.01)
*H01M 8/2465* (2016.01)
*H01M 8/0271* (2016.01)

(56) References Cited

FOREIGN PATENT DOCUMENTS

| | | |
|---|---|---|
| JP | 2014096223 A | 5/2014 |
| JP | 2015053235 A | 3/2015 |
| JP | 2016029610 A | 3/2016 |
| JP | 2016167388 A | 9/2016 |
| JP | 2016526773 A | 9/2016 |
| JP | 2016192391 A | 11/2016 |
| KR | 10-2012-0008272 A | 1/2012 |

STACK MODULE FOR FUEL BATTERY AND HIGH TEMPERATURE ELECTROLYSIS INCLUDING INDIVIDUALLY CHANGEABLE CELL BATTERY MODULE DURING OPERATION

CROSS-REFERENCE TO RELATED APPLICATION

This application claims priority to and the benefit of Korean Patent Application No. 10-2016-0180030 and 10-2017-0135166, filed on Dec. 27, 2016 and Oct. 18, 2017, the disclosure of which is incorporated herein by reference in its entirety.

BACKGROUND

1. Field of the Invention

The present disclosure relates to a stack module for a fuel cell and high temperature electrolysis including an individually changeable cell battery module during operation.

2. Discussion of Related Art

A fuel cell is a high-efficiency clean power generation technique that directly converts hydrogen contained in a hydrocarbon-based material, such as natural gas, coal gas, methanol, and the like, and oxygen in the air into electric energy through an electrochemical reaction. According to a type of electrolyte used in the fuel cell, the fuel cell may be classified into an alkaline fuel cell (AFC), a phosphoric acid fuel cell (PAFC), a molten carbonate fuel cell (MCFC), a solid oxide fuel cell (SOFC), and a polymer electrolyte membrane fuel cell (PEMFC).

A typical device for high temperature electrolysis is called as a solid oxide electrolyzer cell (SOEC) operating in a range of 700° C. to 1000° C. and to which an SOFC technology is applied. That is, stabilized zirconia or the like is used as an electrolyte of an oxygen ion conductor, and hydrogen is produced by electrolyzing water vapor at a high temperature of 750° C. or more.

The fuel cell is configured such that oxygen is supplied to an air electrode (i.e., a cathode) and hydrogen is supplied to a fuel electrode (i.e., an anode), and an electrochemical reaction proceeds in a form of reverse electrolysis of water such that electricity, heat, and water are generated, thereby producing electrical energy without causing pollution.

The SOFC is in the limelight for distributed generation use, commercial use, and home use resulting from advantages in which a position of an electrolyte is relatively easy to control and the position thereof is fixed so that there is no danger of depletion of the electrolyte, and the electrolyte has a long lifetime due to weak corrosiveness. Further, the SOFC is a fuel cell that operates at a high temperature in a range of 600° C. to 1000° C., and the SOFC has many advantages of highest efficiency and less pollution among various types of conventional fuel cells as well as in which a fuel reformer is not required and a combined power generation is possible.

Meanwhile, since the SOFC may not obtain a sufficient voltage with only a single unit cell, unit cells are connected in a stack form as necessary, and the stacked form is classified into two types such as a tubular type and a flat type. The tubular type is an advanced technique in which the unit cells configuring a stack can be easily sealed, and have high resistance to thermal stress and at the same time have a high mechanical strength of the stack so that the tubular type can be manufactured with a large area, and research on the tubular type is actively ongoing.

The above-described tubular stack, however, has a disadvantage in which, even when a problem occurs in some unit cells, an operation of the entire fuel cell system should be stopped and maintenance and repair works should be performed on the entire stack.

PRIOR ART DOCUMENT

Patent Document (Patent Document 1) Korean Patent Application Publication No. 10-2012-0008272.

SUMMARY OF THE INVENTION

The present disclosure is directed to a stack module for a fuel cell and high temperature electrolysis, which is capable of separating, combining, or replacing a plurality of cell battery modules by a one-touch manner during operation so that maintenance costs of the stack module for a fuel cell and high temperature electrolysis is low, and, even when one or more cell battery modules are separated from a fuel transfer panel, the stack module for a fuel cell and high temperature electrolysis, which includes other cell battery modules, can operate normally such that superior power generation efficiency can be provided.

Further, since a plurality of cell battery modules are individually electrically grounded to collect a current using a circuit built in the fuel transfer panel, the plurality of cell battery modules can be individually controlled and also current collection efficiency can be improved.

Furthermore, it is an objective of the present disclosure to provide a stack module for a fuel cell and high temperature electrolysis, which is capable of minimizing heat emission by installing a cell battery module housing individually covering a plurality of cell battery modules, and also individually controlling the plurality of cell battery modules by a heating wire provided therein.

According to one aspect of the present disclosure, a stack module for a fuel cell and high temperature electrolysis includes a plurality of cell battery modules; and a fuel transfer panel to which the plurality of cell battery modules are coupled, wherein each of the plurality of cell battery modules includes a fuel supply port, an air supply port, a fuel discharge port, and an air discharge port, the fuel transfer panel includes a fuel supply port, a fuel discharge port, an air supply port, and an air discharge port which are installed at an outer wall of the fuel transfer panel, and at an interior thereof, a fuel circulation pipe connected to the fuel supply port and the fuel discharge port, and an air circulation pipe connected to the air supply port and the air discharge port, and, when each of the plurality of cell battery modules is coupled to the fuel transfer panel, the fuel supply port and the fuel discharge port of each of the plurality of the cell battery modules are coupled to the fuel circulation pipe to break a connection of the fuel circulation pipe and, simultaneously, to bridge the fuel circulation pipe that is disconnected, thereby allowing fuel to circulate through an interior of each of the plurality of cell battery modules, and at the same time, the air supply port and the air discharge port of each of the plurality of cell battery modules are connected to the air circulation pipe to break a connection of the air circulation pipe and, simultaneously, to bridge the air circulation pipe that is disconnected, thereby allowing air to circulate through the interior of each of the plurality of cell battery modules, and when each of the plurality of cell battery modules is separated from the fuel transfer panel, the fuel circulation pipe and the air circulation pipe are restored.

Also, according to another aspect of the present disclosure, a stack module for a fuel cell and high temperature electrolysis includes a plurality of cell battery modules; and a fuel transfer panel provided with a plurality of cell battery module insertion recesses to which the cell battery modules are fixed, wherein each of the plurality of cell battery modules includes, at one end portion thereof, a tubular type fixer configured to be insertable into and separable from each of the plurality of cell battery module insertion recesses of the fuel transfer panel, and having an outer wall at which a fuel supply port, an air supply port, a fuel discharge port, and an air discharge port are formed, the fuel transfer panel includes a fuel supply port, a fuel discharge port, an air supply port, and an air discharge port which are provided at an outer wall of the fuel transfer panel, each of the plurality of cell battery module insertion recesses formed inside the fuel transfer panel includes a fuel supply port, a fuel discharge port, an air supply port, and an air discharge port, the fuel supply port and the air supply port of each of the cell battery module insertion recesses are communicated with a fuel discharge port and an air discharge port of one adjacent cell battery module insertion recess by the fuel circulation pipe and the air circulation pipe, and the fuel discharge port and the air discharge port thereof are communicated with a fuel supply port and an air supply port of another adjacent cell battery module insertion recess by the fuel circulation pipe and the air circulation pipe, a fuel supply port and an air supply port of one of the plurality of cell battery module insertion recesses of the fuel transfer panel are communicated with the fuel supply port and the air supply port of the outer wall of the fuel transfer panel by the fuel circulation pipe and the air circulation pipe, and a fuel discharge port and an air discharge port of another cell battery module insertion recess are communicated with the fuel discharge port and the air discharge port of the outer wall of the fuel transfer panel by the fuel circulation pipe and the air circulation pipe, a pipe plate, which includes two pipes configured to connect and communicate the fuel supply port to and with the fuel discharge port, and the air supply port to and with the air discharge port in a state in which the cell battery module is not inserted into the cell battery module insertion recess, is provided at the cell battery module insertion recess, wherein the pipe plate includes an elastic member, and thus, when the cell battery module is inserted into the cell battery module insertion recess, the pipe plate is moved downward by a pressure, and, when the cell battery module is separated from the cell battery module insertion recess, the pipe plate is moved upward by an elastic force to connect and communicate the fuel supply port to and with the fuel discharge port, and the air supply port to and with the air discharge port, wherein the fuel supply port, the fuel discharge port, the air supply port, and the air discharge port are included in the cell battery module insertion recess.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION OF EXEMPLARY EMBODIMENTS

Hereinafter, preferred embodiments of the present disclosure will be described in detail with reference to the accompanying drawings. In the following description of the present disclosure, if a detailed description of the known related art is determined to obscure the gist of the present disclosure, the detailed description thereof will be omitted.

The following description and drawings illustrate specific embodiments in order that those skilled in the art can readily implement an apparatus and a method which will be described below. Other embodiments may include modifications which are structurally and logically different therefrom. Unless explicitly required, an individual component and a function thereof may be generally selected, and the order of processes may be varied. Portions and features of some embodiments may be included in other embodiments or may be replaced by other embodiments.

Figure 1:
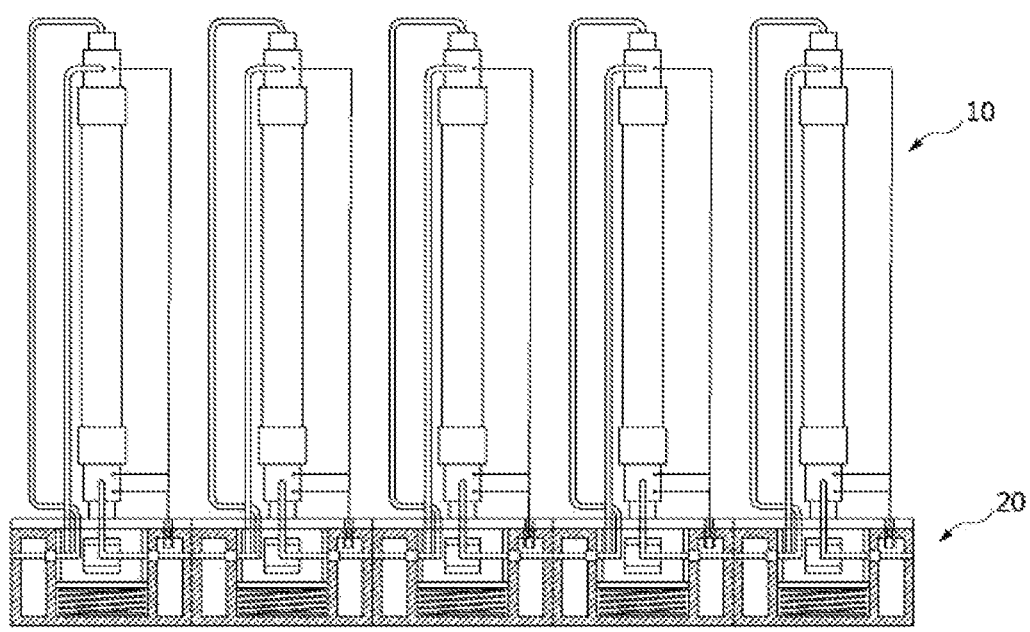
FIG. 1 is a diagram illustrating a stack module for a fuel cell and high temperature electrolysis according to an embodiment of the present disclosure.
Figure 2A:
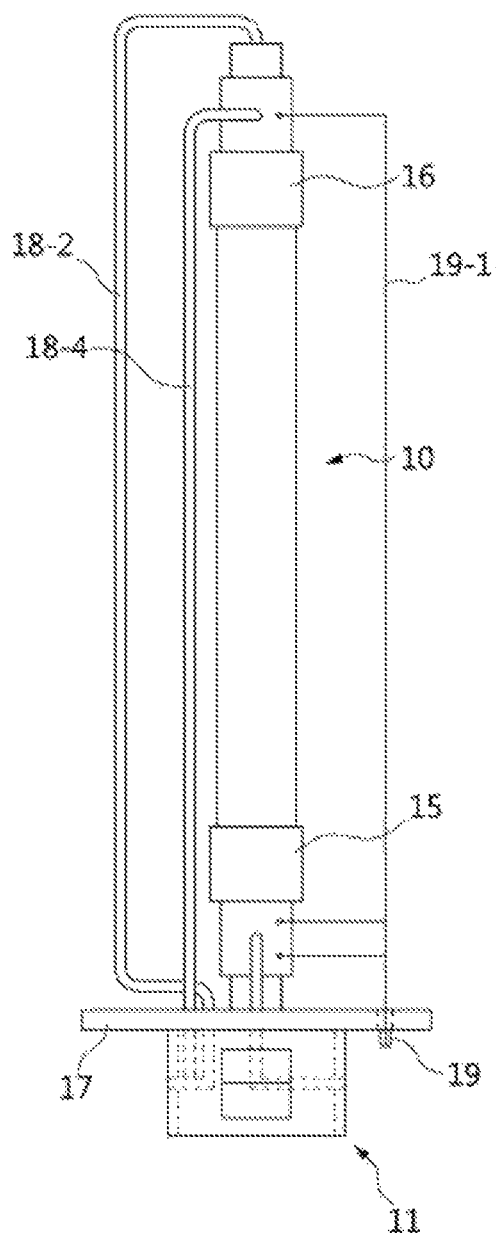
FIG. 2A is a diagram illustrating a front view of a tubular type cell battery module according to an embodiment of the present disclosure.
Figure 2B:
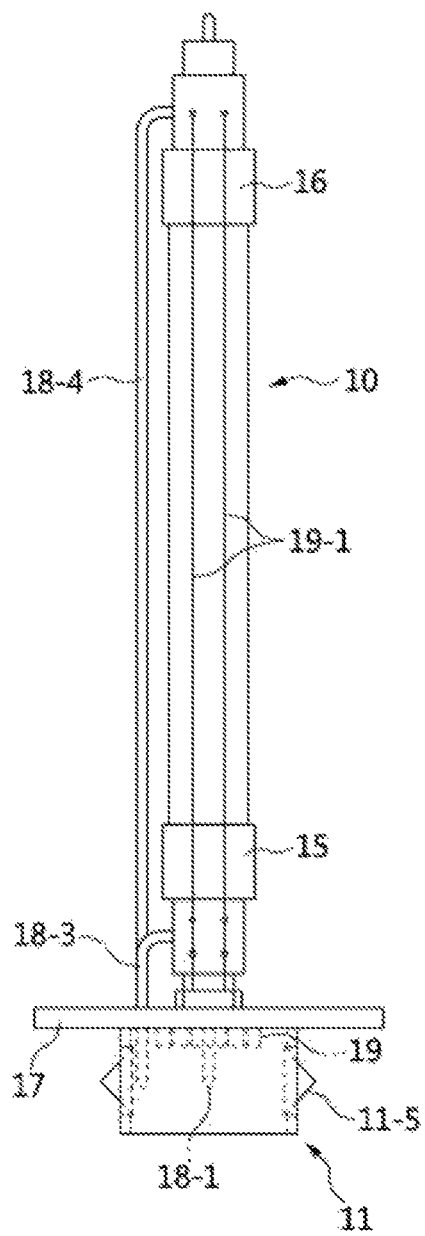
FIG. 2B is a diagram illustrating a right side view of a tubular type cell battery module according to an embodiment of the present disclosure.
Figure 3:
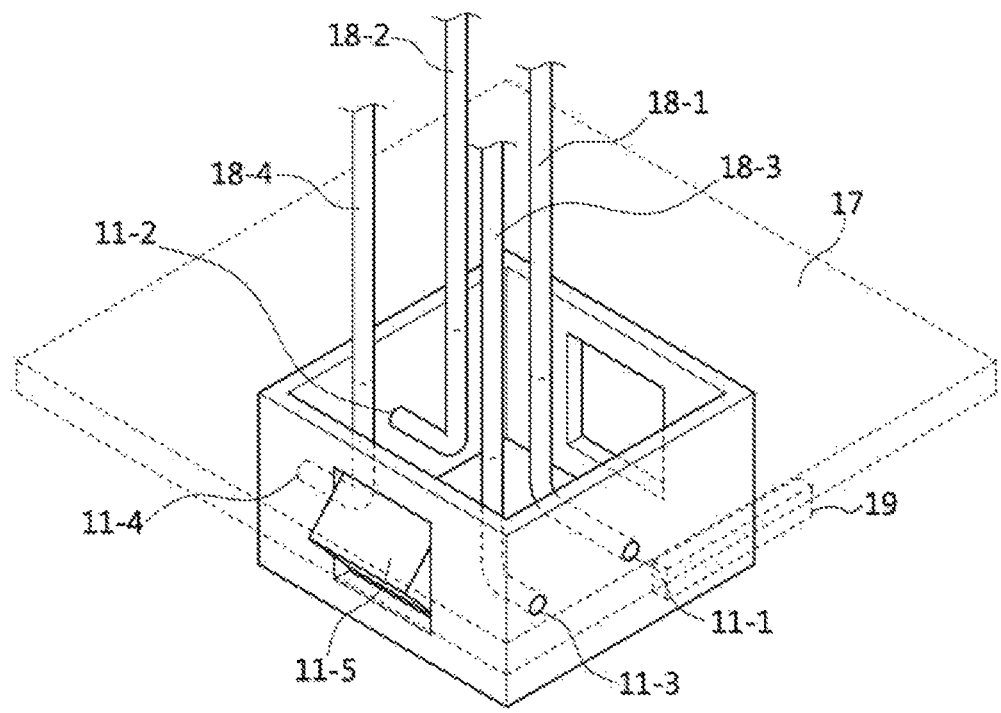
FIG. 3 is a perspective view illustrating a lower structure of the tubular type cell battery module according to the embodiment of the present disclosure.

FIG. 1 is a diagram illustrating a stack module for a fuel cell and high temperature electrolysis according to an embodiment of the present disclosure, FIG. 2A is a diagram illustrating a front view of a tubular type cell battery module according to an embodiment of the present disclosure, FIG. 2B is a diagram illustrating a right side view of a tubular type cell battery module according to an embodiment of the present disclosure, and FIG. 3 is a perspective view illustrating a lower structure of the tubular type cell battery module according to the embodiment of the present disclosure.

Figure 4:
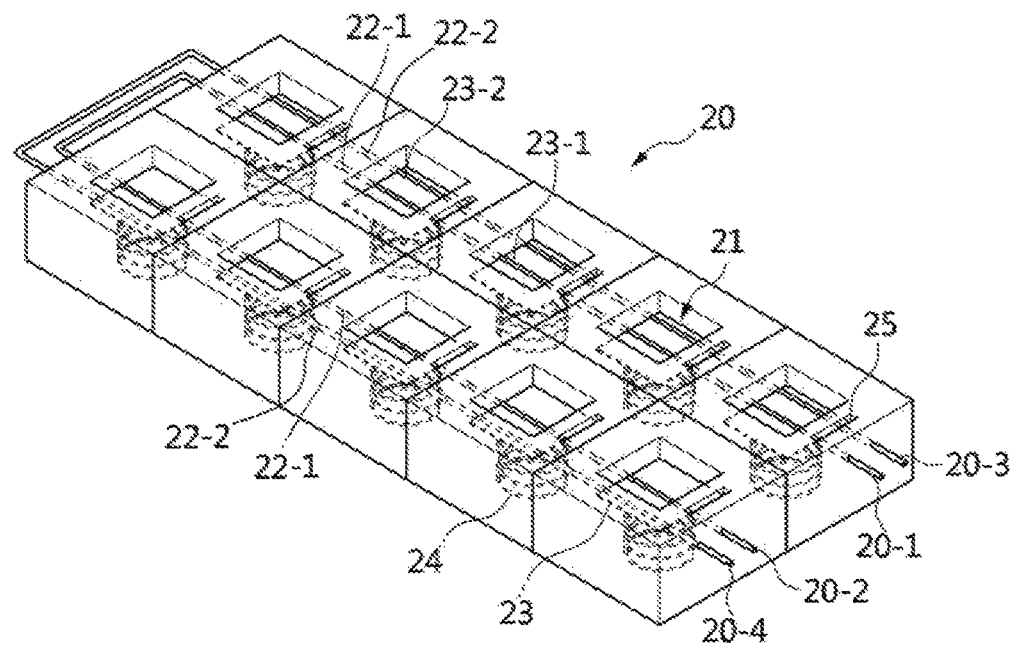
FIG. 4 is a perspective view illustrating a structure of a fuel transfer panel according to an embodiment of the present disclosure.
Figure 5:
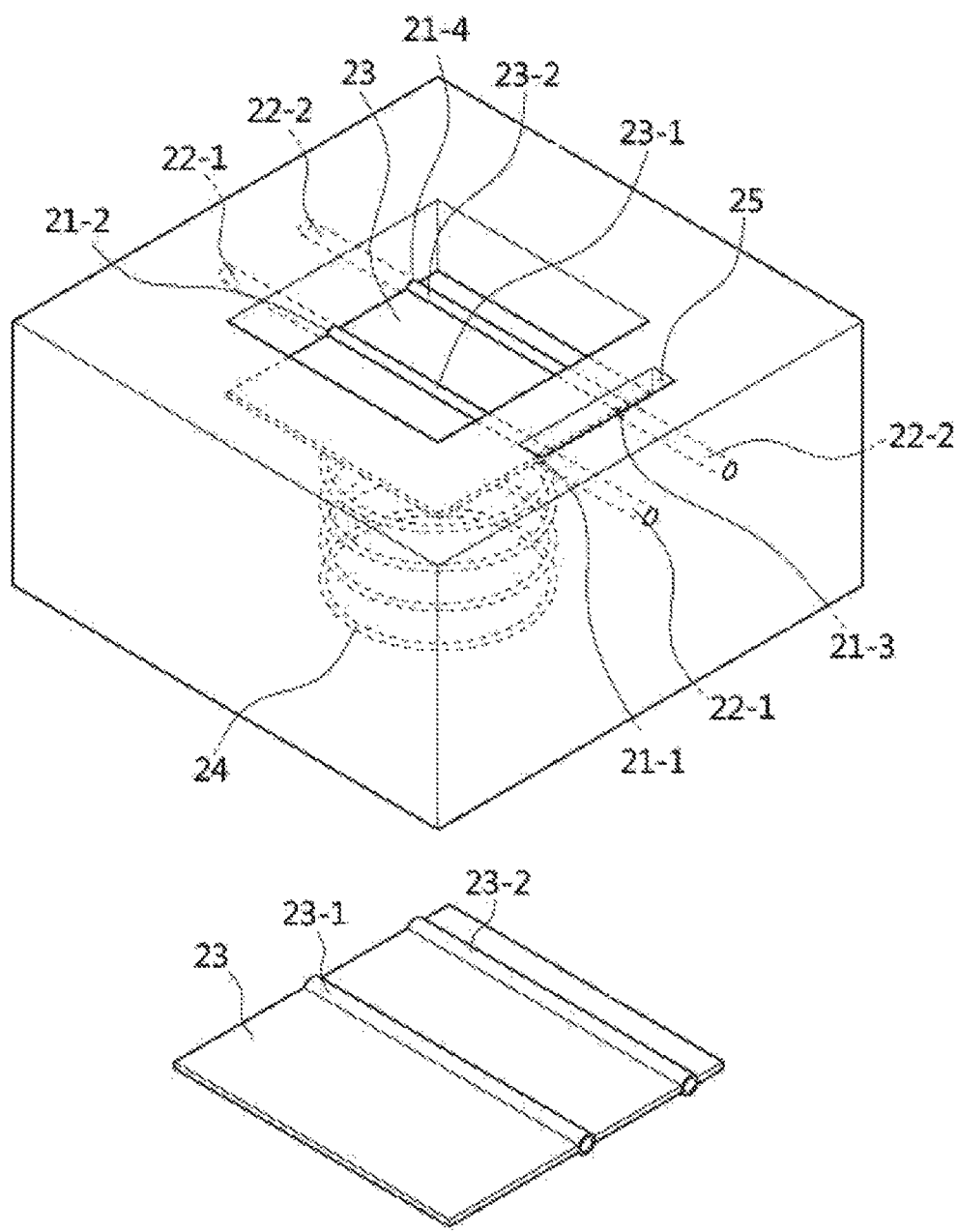
FIG. 5 is a perspective view illustrating a structure of a single cell included in the fuel transfer panel according to the embodiment of the present disclosure.
Figure 6A:
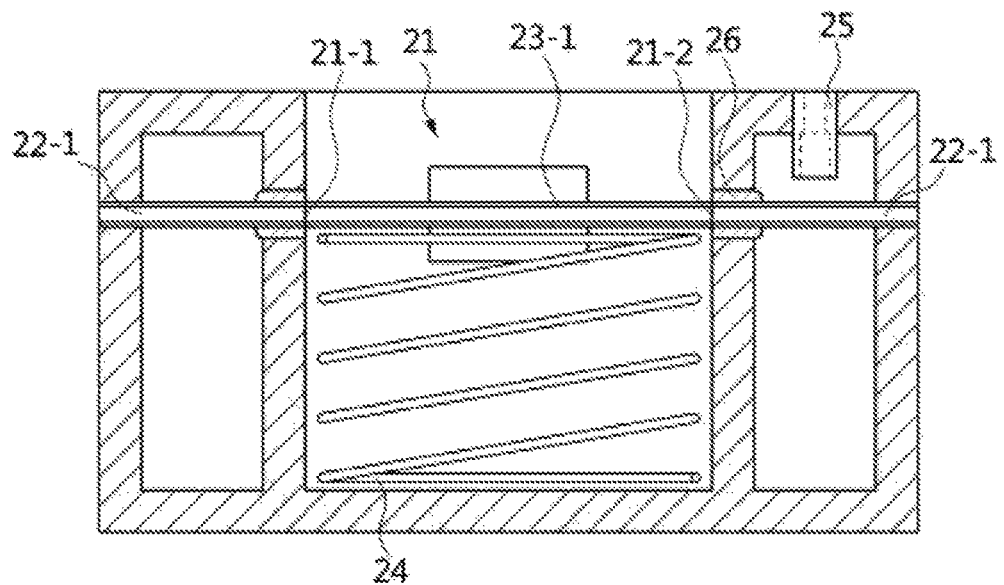
FIG. 6A is a cross-sectional front view illustrating the single cell included in the fuel transfer panel according to the embodiment of the present disclosure.
Figure 6B:
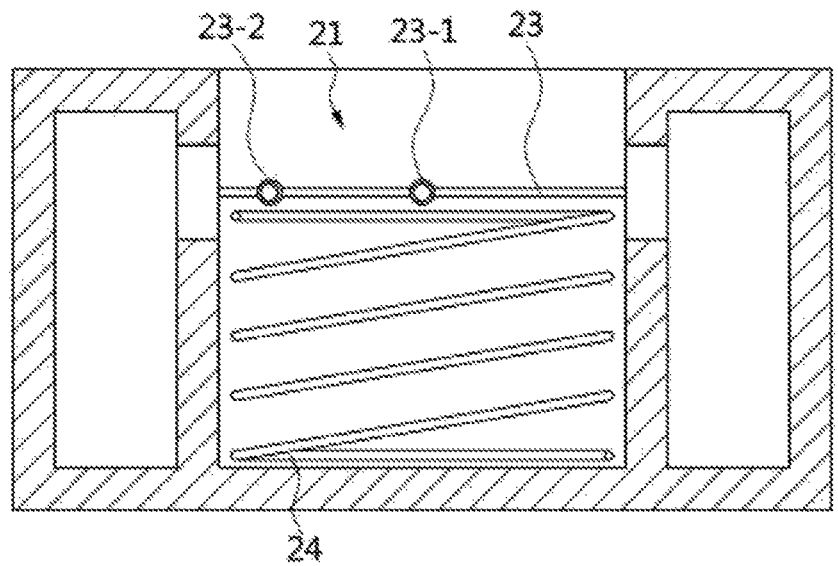
FIG. 6B is a cross-sectional right side view illustrating the single cell included in the fuel transfer panel according to the embodiment of the present disclosure.

Also, FIG. 4 is a perspective view illustrating a structure of a fuel transfer panel according to an embodiment of the present disclosure, FIG. 5 is a perspective view illustrating a structure of a single cell included in the fuel transfer panel according to the embodiment of the present disclosure, FIG. 6A is a cross-sectional front view illustrating the single cell included in the fuel transfer panel according to the embodiment of the present disclosure, and FIG. 6B is a cross-sectional right side view illustrating the single cell included in the fuel transfer panel according to the embodiment of the present disclosure.

Figure 7A:
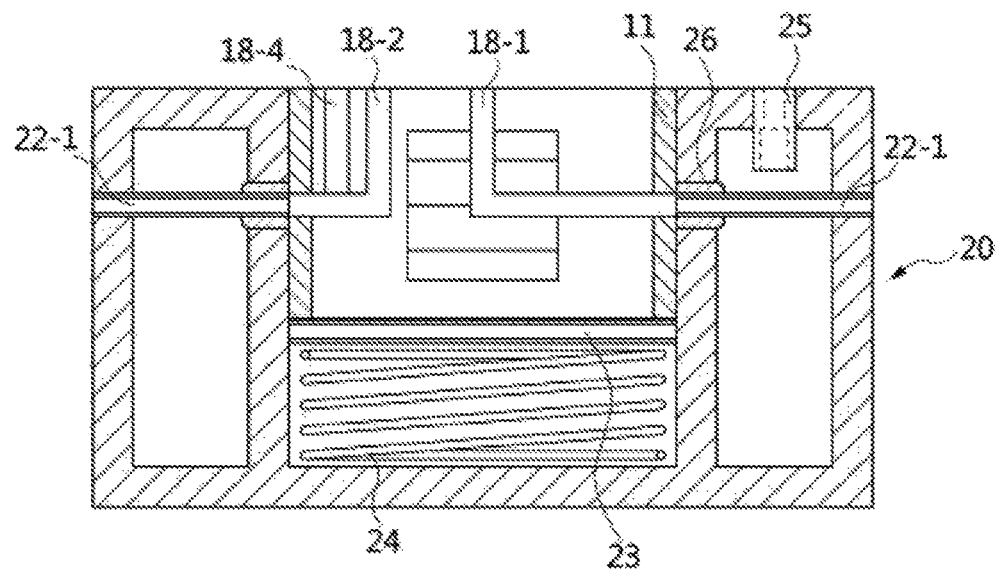
FIG. 7A is a cross-sectional front view illustrating a state in which a tubular type fixer of the tubular type cell battery module is inserted into the single cell included in the fuel transfer panel according to the embodiment of the present disclosure.
Figure 7B:
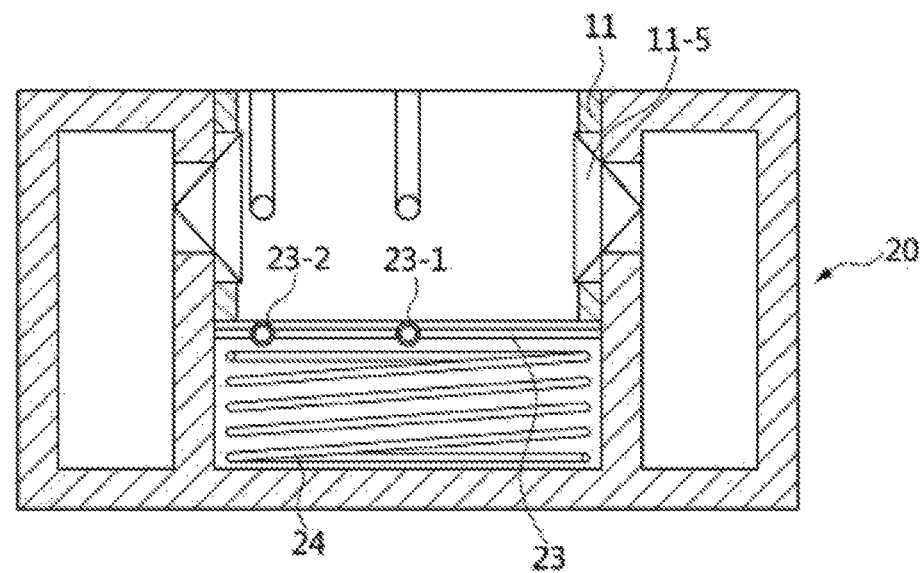
FIG. 7B is a cross-sectional right side view illustrating a state in which a tubular type fixer of the tubular type cell battery module is inserted into the single cell included in the fuel transfer panel according to the embodiment of the present disclosure.
Figure 8:
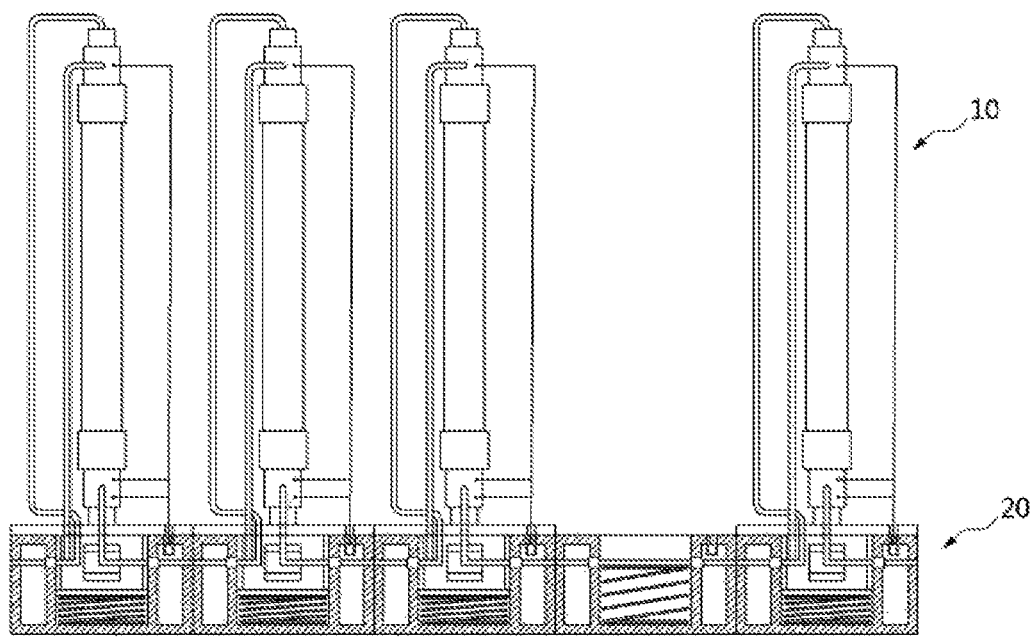
FIG. 8 is a diagram illustrating a state in which a single tubular type cell battery module is separated in the stack module for a fuel cell and high temperature electrolysis according to the embodiment of the present disclosure.
Figure 9:
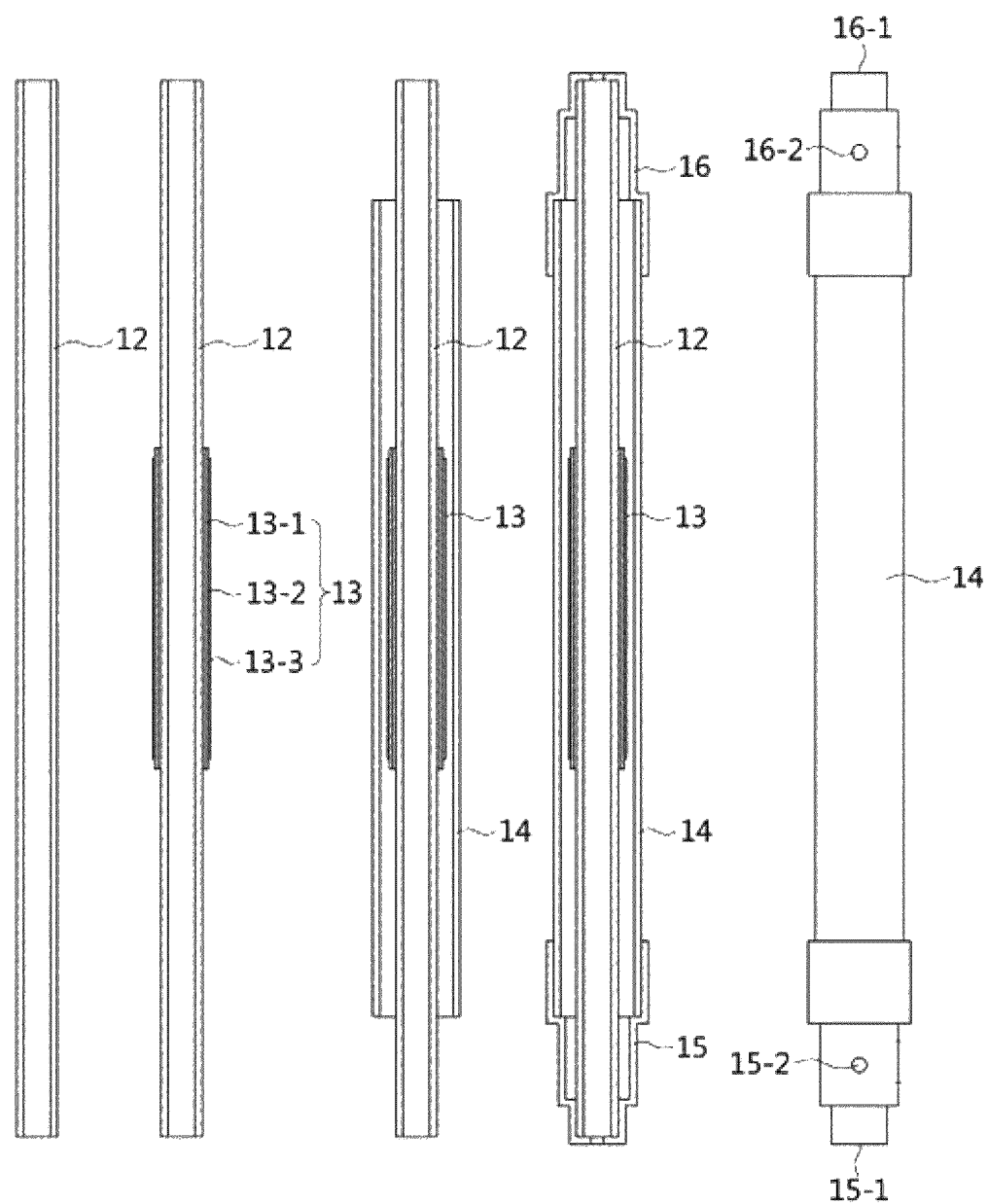
FIG. 9 is a diagram illustrating an upper structure of the tubular type cell battery module according to the embodiment of the present disclosure.

Further, FIG. 7A is a cross-sectional front view illustrating a state in which a tubular type fixer of the tubular type cell battery module is inserted into the single cell included in the fuel transfer panel according to the embodiment of the present disclosure, FIG. 7B is a cross-sectional right side view illustrating a state in which a tubular type fixer of the tubular type cell battery module is inserted into the single cell included in the fuel transfer panel according to the embodiment of the present disclosure, FIG. 8 is a diagram illustrating a state in which a single tubular type cell battery module is separated in the stack module for a fuel cell and high temperature electrolysis according to the embodiment of the present disclosure, and FIG. 9 is a diagram illustrating an upper structure of the tubular type cell battery module according to the embodiment of the present disclosure.

As shown in FIGS. 1 to 9, the present disclosure includes a plurality of cell battery modules 10 and a fuel transfer panel 20 to which the plurality of cell battery modules 10 are coupled.

As shown in FIGS. 2A, 2B and 3, each of the plurality of cell battery modules 10 includes a fuel supply port 11-1, an air supply port 11-3, a fuel discharge port 11-2, and an air discharge port 11-4.

As shown in FIGS. 4 and 5, the fuel transfer panel 20 includes a fuel supply port 20-1, a fuel discharge port 20-2, an air supply port 20-3, and an air discharge port 20-4 which are installed at an outer wall of the fuel transfer panel 20, a fuel circulation pipe 22-1 connected to the fuel supply port 20-1 and the fuel discharge port 20-2, and an air circulation pipe 22-2 connected to the air supply port 20-3 and the air discharge port 20-4, wherein the fuel circulation pipe 22-1 and the air circulation pipe 22-2 are provided inside the fuel transfer panel 20.

When the cell battery module 10 is coupled to the fuel transfer panel 20, the fuel supply port 20-1 and the fuel discharge port 20-2 of the cell battery module 10 are coupled to the fuel circulation pipe 22-1 to break a connection of the fuel circulation pipe 22-1 and, simultaneously, to bridge the fuel circulation pipe 22-1 that is disconnected, thereby allowing fuel to circulate through an interior of the cell battery module 10, and at the same time the air supply port 20-3 and the air discharge port 20-4 are connected to the air circulation pipe 22-2 to break a connection of the air circulation pipe 22-2 and, simultaneously, to bridge the air circulation pipe 22-2 that is disconnected, thereby allowing air to circulate through the interior of the cell battery module 10.

Accordingly, in the stack module for a fuel cell and high temperature electrolysis according to the embodiment of the present disclosure, when the cell battery module 10 is separated from the fuel transfer panel 20, the fuel circulation pipe 22-1 and the air circulation pipe 22-2 are restored again.

Components configuring the stack module for a fuel cell and high temperature electrolysis may employ technical structures known in the art without limitation as long as they can implement the technical features described above. Further, all of contents described in the following specific embodiments may be applied to the components.

The shape of the cell battery module in the present disclosure is not particularly limited, and any of the shapes known in the art can be applied thereto.

Also, in the stack module for a fuel cell and high temperature electrolysis of the present disclosure, the high temperature electrolysis may be implemented using, for example, a solid oxide fuel cell (SOFC) stack module.

Hereinafter, a more specific form of the stack module for a fuel cell and high temperature electrolysis of the present disclosure will be described. As shown in FIGS. 1 to 9, the present disclosure includes a plurality of tubular type cell battery modules 10 and a fuel transfer panel 20 having a plurality of cell battery module insertion recesses 21 to which the plurality of tubular type cell battery modules 10 are fixed.

As shown in FIGS. 2A, 2B, 3 and 4, each of the plurality of tubular type cell battery modules 10 includes, at one end portion thereof, a tubular type fixer 11 configured to be insertable into and separable from each of the plurality of cell battery module insertion recesses 21 of the fuel transfer panel 20 and having an outer wall at which the fuel supply port 11-1, the air supply port 11-3, the fuel discharge port 11-2, and the air discharge port 11-4 are formed.

As shown in FIGS. 4 and 5, the fuel transfer panel 20 includes the fuel supply port 20-1, the fuel discharge port 20-2, the air supply port 20-3, and the air discharge port 20-4 which are provided at the outer wall of the fuel transfer panel 20.

Each of the plurality of cell battery module insertion recesses 21 formed inside the fuel transfer panel 20 includes a fuel supply port 21-1, a fuel discharge port 21-2, an air supply port 21-3, and an air discharge port 21-4.

The fuel supply port 21-1 and the air supply port 21-3 of each of the insertion recesses 21 are communicated with the fuel discharge port 21-2 and the air discharge port 21-4 of one adjacent insertion recess 21 through the fuel circulation pipe 22-1 and the air circulation pipe 22-2, and the fuel discharge port 21-2 and the air discharge port 21-4 of each of the insertion recesses 21 are communicated with the fuel supply port 21-1 and the air supply port 21-3 of another adjacent insertion recess 21 through the fuel circulation pipe 22-1 and the air circulation pipe 22-2.

The fuel supply port 21-1 and the air supply port 21-3 of one of all the insertion recesses 21 of the fuel transfer panel 20 are communicated with the fuel supply port 20-1 and the air supply port 20-3 of the outer wall of the fuel transfer panel 20 through a pipe 22, and the fuel discharge port 21-2 and the air discharge port 21-4 of another insertion recess 21 are communicated with the fuel discharge port 20-2 and the air discharge port 20-4 of the outer wall of the fuel transfer panel 20 through the pipe 22.

As shown in FIGS. 5, 6A, 6B, 7A and 7B, the insertion recess 21 is provided with a pipe plate 23 including two pipes 23-1 and 23-2 configured to connect and communicate the fuel supply port 21-1 to and with the fuel discharge port 21-2, and the air supply port 21-3 to and with the air discharge port 21-4, which are provided at the insertion recess 21 in a state in which the cell battery module 10 is not inserted into the insertion recess 21, and the pipe plate 23 includes an elastic member 24 and thus, when the cell battery module 10 is inserted into the insertion recess 21, the pipe plate 23 is pushed downward by a pressure, and, when the cell battery module 10 is separated from the insertion recess 21, the pipe plate 23 is moved upward by an elastic force to connect and communicate the fuel supply port 21-1 to and with the fuel discharge port 21-2, and the air supply port 21-3 to and with the air discharge port 21-4, which are included in the insertion recess 21.

The fuel transfer panel 20 may have a rectangular parallelepiped shape, but is not limited thereto, and various shapes may be applied to the fuel transfer panel 20. The plurality of cell battery module insertion recesses 21 may be preferably designed to have the same number as that of the plurality of tubular type cell battery modules 10.

Although the plurality of cell battery module insertion recesses 21 are shown as being designed as a 2×5 matrix array in FIG. 4, this is merely illustrative and thus the cell battery module insertion recesses 21 may be modified and designed in various forms according to a design purpose. That is, two or more among the plurality of cell battery module insertion recesses 21 may be provided inside the fuel transfer panel 20 in one or more rows.

The elastic member 24 is not particularly limited, and any elastic member known in the art may be used without limitation. For example, an elastic member such as a spring and the like may be used.

The fuel circulation pipe 22-1 and the air circulation pipe 22-2 may be disposed to be inserted into the fuel transfer panel 20.

The plurality of tubular type cell battery modules 10 may be fitted into and coupled to the insertion recesses 21 of the fuel transfer panel 20. In this way, when the stack module is designed in a one-touch manner, the cell battery modules 10 can be frequently individually coupled, separated, and replaced as necessary, thereby providing a structural advantage of easy maintenance.

In the stack module for a fuel cell and high temperature electrolysis according to the present disclosure, fuel known in the art can be used without limitation, and, for example, methane-based gas, ammonia-based gas, $CO_2$ gas, CO gas, and the like may be used. For example, an SOFC reaction and a solid oxide electrolyzer cell (SOEC) reaction may be reversibly performed by supplying at least one gas of $CO_2$ and CO inside the cell battery module 10, and thus charging and discharging may be possible such that a large amount of energy can be stored.

Further, when methane-based or ammonia-based synthetic gas is supplied as fuel, the SOFC reaction and the SOEC reaction are utilized so that the methane-based or ammonia-based synthetic gas may be produced through an electrochemical membrane reaction of high temperature oxygen ion conductors.

As shown in FIGS. 4 and 8, the stack module for a fuel cell and high temperature electrolysis according to the present disclosure can be separated in a state in which an operation of the fuel cell is not stopped even when one or more of the cell battery modules 10 should be separated from the fuel transfer panel 20 due to a failure or the like.

That is, even though one or more of the cell battery modules 10 coupled to the fuel transfer panel 20 are separated therefrom, in the cell battery module insertion recess 21 from which the one or more cell battery modules 10 are separated, the pipe plate 23 including the two pipes 23-1 and 23-2 is moved upward by an elastic force to connect and communicate the fuel supply port 21-1 to and with the fuel discharge port 21-2, and the air supply port 21-3 to and with the air discharge port 21-4, so that the fuel cell may operate normally by the cell battery modules 10 which are remained therein.

Further, when the separated cell battery module 10 may perform a normal function, even in a state in which the operation of the fuel cell is not stopped, the separated cell battery module 10 may be used by being coupled to the fuel transfer panel 20 whenever necessary.

Therefore, even when an operation failure occurs at each of the cell battery modules 10, the stack module for a fuel cell and high temperature electrolysis according to the present disclosure may conveniently perform maintenance on each of the cell battery modules 10 while the operation of the fuel cell is maintained such that maintenance costs are low and power generation efficiency is very high.

In the stack module for a fuel cell and high temperature electrolysis according to the present disclosure, the shape of the tubular type cell battery module 10 is not particularly limited as long as it is capable of performing the functions described above.

Referring to FIG. 9, the shape of the tubular type cell battery module 10 will be described in detail with reference to a specific embodiment. The tubular type cell battery module 10 may include a tubular type electrode stacked body 13 in which a fuel electrode 13-1, an electrolyte layer 13-2, and an air electrode 13-3 are sequentially stacked. In the electrode stacked body 13, the fuel electrode 13-1 may form an innermost tube and may also serve as a supporter for allowing the electrolyte layer 13-2 and the air electrode 13-3 to be stacked on the fuel electrode 13-1. Alternatively, the air electrode 13-3 may form an innermost tube and may also serve as a supporter for allowing the electrolyte layer 13-2 and the fuel electrode 13-1 to be stacked on the air electrode 13-3.

The shape of the electrode stacked body 13 is not particularly limited, and any shape known in the art may be used without limitation.

The tubular type cell battery module 10 may further include an outer tube 14 configured to accommodate the tubular type electrode stacked body 13 therein. The outer tube 14 may serve to seal the electrode stacked body 13 from the outside.

Fuel gas may be supplied to the tubular type cell battery module 10 through a central portion of the tubular type electrode stacked body 13, and air may be supplied to the tubular type cell battery module 10 through the outer tube 14. In this case, when the outer tube 14 is not provided, air is commonly supplied from the outside to the tubular type cell battery modules 10.

Alternatively, the air may be supplied through the central portion of the tubular type electrode stacked body 13 and the fuel gas may be supplied through the outer tube 14. However, in terms of efficiency, it may be more preferable to supply air through an interior of the outer tube 14, which has a wider area.

A porous support tube 12 may be further included inside the tubular type electrode stacked body 13, and, in this case, the porous support tube 12 may perform a function of current collector.

A heating wire (not shown) configured to heat the cell battery module 10 may be further provided inside or outside the outer tube 14. For example, the heating wire may be spirally wound on an outer surface of the outer tube 14 at a predetermined interval, or may be spirally embedded in an inner wall of the outer tube 14. The heating wire may be set to heat the cell battery module 10 to a temperature in a range of, for example, 600° C. to 800° C., but is not limited thereto. As described above, when the heating wire is mounted on the outer tube 14, a separate heating device is not required so that a volume of the cell battery module 10 can be reduced.

The outer tube 14 may be preferably made of a material having superior heat resistance and superior sealing ability at a high temperature, and for example, a material such as a quartz, an alumina, or the like may be used.

A thermocouple (not shown) configured to sense a temperature of the cell battery module 10 may be embedded in the outer tube 14 or the fuel cell support tube 12.

The stack module for a fuel cell and high temperature electrolysis, which employs an individual control method, according to the embodiment of the present disclosure can completely seal the fuel supplied inside the hollow of the unit cell by the outer tube 14, and thus reversibility due to the SOFC reaction and the SOEC reaction can be secured to allow charging and discharging and also a complete sealing structure can be designed to compensate for problems such as degradation in durability and current collection efficiency due to deposition of carbon when recovering or producing synthesis gas as in the conventional SOFC/SOEC stack such that the stack module has a structure capable of producing synthesis gas of methane as well as ammonia.

As shown in FIGS. 3 and 9, in the stack module for a fuel cell and high temperature electrolysis according to the present disclosure, an electrical wiring connector 19 may be installed at a fixing plate 17 to protrude from a side of the tubular type fixer 11 to be insertable into and separable from the fuel transfer panel 20. Two electrical wirings 19-1 extending from two points of the fuel electrode 13-1 and two electrical wirings 19-1 extending from two points of the air electrode 13-3 may be connected to individual terminals of the electrical wiring connector 19. Further, electrical wirings extending from both ends of the heating wire and electrical wirings extending from the thermocouple may also be connected to the individual terminals of the electrical wiring connector 19.

As shown in FIG. 4, an electrical wiring connector accommodation recess 25 may be further provided at a side of each of the cell battery module insertion recesses 21 of the fuel transfer panel 20, wherein the electrical wiring connector 19 is insertable into the electrical wiring connector accommodation recess 25 (See FIG. 5).

The electrical wiring connector accommodation recesses 25 may be connected to other electrical wiring connector accommodation recesses by electrical wirings through the interior of the fuel transfer panel 20 to connect the plurality of cell battery modules 10, or may be individually connected to a central processing unit (CPU) via a relay.

When the electrical wirings are connected to the CPU via separate relays, temperature heating of each of the cell battery modules can be monitored and controlled through software and a circuit design, currents can be collected at or supplied to each of the fuel electrode and the air electrode, and unit cells can be connected again in parallel or in series in an individual circuit to generate power. Therefore, the individual control type stack module for a fuel cell and high temperature electrolysis according to the embodiment of the present disclosure can be driven by an individual heating control method.

In addition, when a current is collected from the plurality of cell battery modules 10, since the plurality of cell battery modules 10 are individually electrically grounded by using the circuit embedded in the fuel transfer panel 20, current collection efficiency can be improved, and also there is no need to install a separate inter-connector such that a structure can be simplified.

Each of the fuel electrode 13-1 and the air electrode 13-3 may be made of any material known in the art without limitation, and, for example, an oxygen ion conductor containing ceria doped with one or more among platinum, nickel, palladium, silver, lanthanum, perovskite oxide, zirconia doped with yttrium or scandium, gadolinium, samarium, lanthanum, ytterbium, and neodymium; strontium manganese oxide (LSM) doped with zeolite, lanthanum, or calcium; lanthanum strontium cobalt iron oxide (LSCF); nickel oxide (NiO); tungsten carbide; Pd; Pd—Ag alloy; and a hydrogen ion conductive metal containing one or more among V may be used.

The electrolyte layer 13-2 may be made of any material known in the art without limitation, and, for example, a hydrocarbon-based polymer, fluoropolymer, yttria-stabilized zirconia, $(La,Sr)(Ga,Mg)O_3$, $Ba(Zr,Y)O_3$, Gd doped $CeO_2$ (GDC), $Y_2O_3$ doped $CeO_3$ (YDC), yttrium-stabilized zirconia (YSZ), scandium-stabilized zirconia (ScSZ), and the like may be used.

As shown in FIGS. 2A, 2B, 3, and 9, in the stack module for a fuel cell and high temperature electrolysis according to the present disclosure, the tubular type cell battery module 10 further includes a first cap 15 configured to cover one end portion of each of the tubular type electrode stacked body 13 and the outer tube 14 and provided with a fuel supply port 15-1 and an air supply port 15-2; a second cap 16 configured to cover the other end portion of each of the tubular type electrode stacked body 13 and the outer tube 14 and provided with a fuel discharge port 16-1 and an air discharge port 16-2; a fixing plate 17 having one surface to which the first cap 15 is fixed and the other surface to which the tubular type fixer 11 is fixed; and a pipe portion including a first pipe 18-1 configured to connect the fuel supply port 15-1 of the first cap 15 to the fuel supply port 11-1 of the tubular type fixer 11, a second pipe 18-3 configured to connect the air supply port 15-2 of the first cap 15 to the air supply port 11-3 of the tubular type fixer 11, a third pipe 18-2 configured to connect the fuel discharge port 16-1 of the second cap 16 to the fuel discharge port 11-2 of the tubular type fixer 11, and a fourth pipe 18-4 configured to connect the air discharge port 16-2 of the second cap 16 to the air discharge port 11-4 of the tubular type fixer 11.

The first to fourth pipes 18-1, 18-3, 18-2, and 18-4 may pass through the fixing plate 17 to be connected.

As shown in FIGS. 2A, 2B, 3, 7A and 7B, a hook 11-5 may be further provided at the tubular type fixer 11 of the cell battery module 10 so as to firmly maintain a coupling between the tubular type fixer 11 and the cell battery module insertion recess 21 when the tubular type fixer 11 is inserted into the cell battery module insertion recess 21 formed inside the fuel transfer panel 20. FIG. 2A shows a front view, and FIG. 2B shows a right side view.

Figure 10:
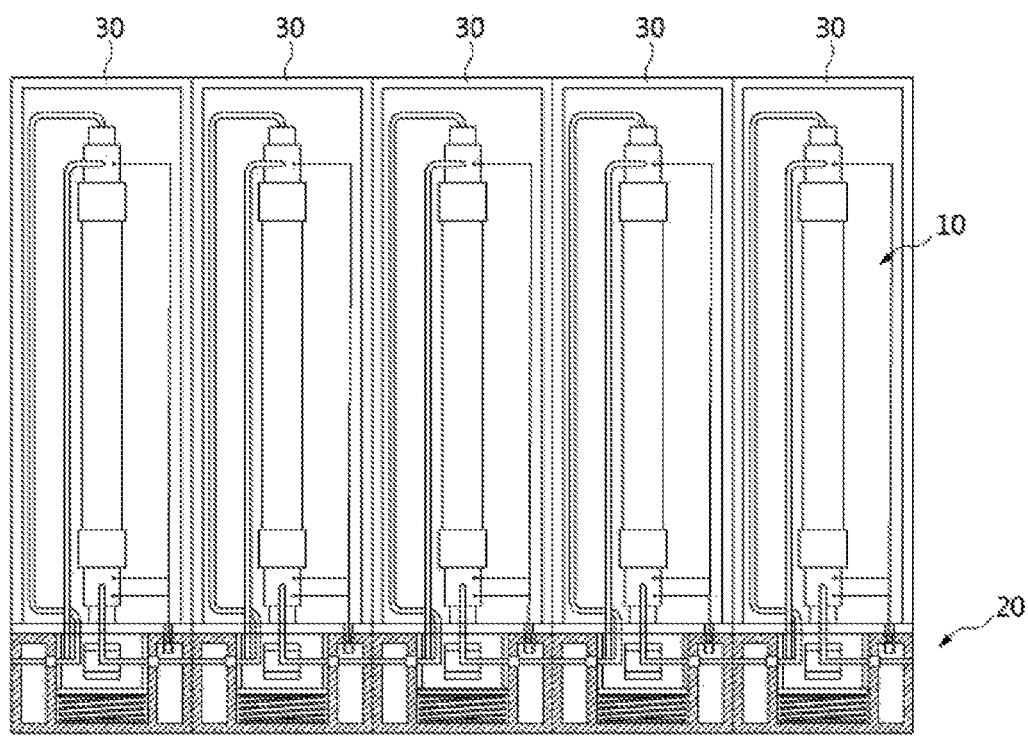
FIG. 10 is a diagram illustrating a state in which a cell battery module housing is provided in the stack module for a fuel cell and high temperature electrolysis according to the embodiment of the present disclosure.

As shown in FIG. 10, a cell battery module housing 30 capable of covering the cell battery module 10 may be further provided at the fixing plate 17. As described above, when the individual cell battery module housing 30 is provided, heat emission of the cell battery module 10 can be minimized and also the cell battery module 10 can be individually controlled by individual heating such that energy efficiency can be maximized.

In the stack module for a fuel cell and high temperature electrolysis according to the present disclosure, a sealing member may be further provided at each of the fuel supply port 11-1, the air supply port 11-3, the fuel discharge port 11-2, and the air discharge port 11-4 which are formed at an outer wall of the tubular type fixer 11.

Further, a sealing member 26 may be further provided at each of the fuel supply port 21-1, the fuel discharge port 21-2, the air supply port 21-3, and the air discharge port 21-4 which are provided at each of the plurality of cell battery module insertion recesses 21 formed inside the fuel transfer panel 20 (See, FIGS. 6A, 6B, 7A and 7B).

In the stack module for a fuel cell and high temperature electrolysis according to the present disclosure, a plurality of cell battery modules having the same characteristic may be used, and a plurality of cell battery modules having different characteristics may also be combined to be used. For example, in FIG. 4, cell battery modules having different fuel efficiencies may be sequentially coupled to the cell battery module insertion recesses 21 provided in the fuel transfer panel 20 and may configure the stack module for a fuel cell and high temperature electrolysis to achieve overall fuel usage efficiency of 100%.

Specifically, fuel supplied to a first cell battery module may be hydrogen of 100%, but the fuel discharged via the first cell battery module includes hydrogen and steam (water) as the unit cells generate power. Consequently, since the fuel including hydrogen and steam is supplied to a second cell battery module subsequently connected to the first cell battery module, a cell battery module having an output density performance different from that of the first cell battery module is disposed as the second cell battery module such that overall fuel usage efficiency can be improved. This configuration may also be applied to cell battery modules subsequently connected to the second cell battery module.

Further, the present disclosure provides a stack module laminate for a fuel cell and high temperature electrolysis, which is configured such that two or more stack modules for a fuel cell and high temperature electrolysis are coupled.

The stack module for a fuel cell and high temperature electrolysis may be stacked in a horizontal stacking manner or in a vertical stacking manner. Alternatively, the stack module may be stacked in a horizontal/vertical mixed stacking method in which a vertical stacking and a horizontal stacking are mixed.

Connections of the fuel supply ports, the fuel discharge ports, the air supply ports, and the air discharge ports between the stack modules for a fuel cell and high temperature electrolysis may be implemented in a conventional method in the art.

Further, the present disclosure provides a method for coupling and separating a cell battery module to and from a fuel transfer panel in a stack module for a fuel cell and high temperature electrolysis, wherein the stack module includes a plurality of cell battery modules 10 and a fuel transfer panel 20 to which the plurality of cell battery modules 10 are coupled, each of the plurality of cell battery modules 10 is provided with the fuel supply port 11-1, the air supply port 11-3, the fuel discharge port 11-2, and the air discharge port 11-4 as shown in FIGS. 2A, 2B and 3, and the fuel transfer panel 20 has the outer wall at which the fuel supply port 20-1, the fuel discharge port 20-2, the air supply port 20-3, and the air discharge port 20-4 are installed, and the interior in which the fuel circulation pipe 22-1 connected to the fuel supply port 20-1 and the fuel discharge port 20-2, and the air circulation pipe 22-2 connected to the air supply port 20-3 and the air discharge port 20-4, the method including, when the cell battery module 10 is coupled to the fuel transfer panel 20, coupling the fuel supply port 11-1 and the fuel discharge port 11-2 of the cell battery module 10 to the fuel circulation pipe 22-1 to break a connection of the fuel circulation pipe 22-1 and, simultaneously, to bridge the fuel circulation pipe 22-1 that is disconnected, thereby allowing fuel to circulate through an interior of the cell battery module 10; coupling the air supply port 11-3 and the air discharge port 11-4 of the cell battery module 10 to the air circulation pipe 22-2 to break a connection of the air circulation pipe 22-2 and, simultaneously, to bridge the air circulation pipe 22-2 that is disconnected, thereby allowing air to circulate through the interior of the cell battery module 10; and when the cell battery module 10 is separated from the fuel transfer panel 20, restoring the fuel circulation pipe 22-1 and the air circulation pipe 22-2.

All the above-described contents related to the stack module for a fuel cell and high temperature electrolysis may be applied to this method. Therefore, an overlapping description thereof will be omitted.

Figure 11:
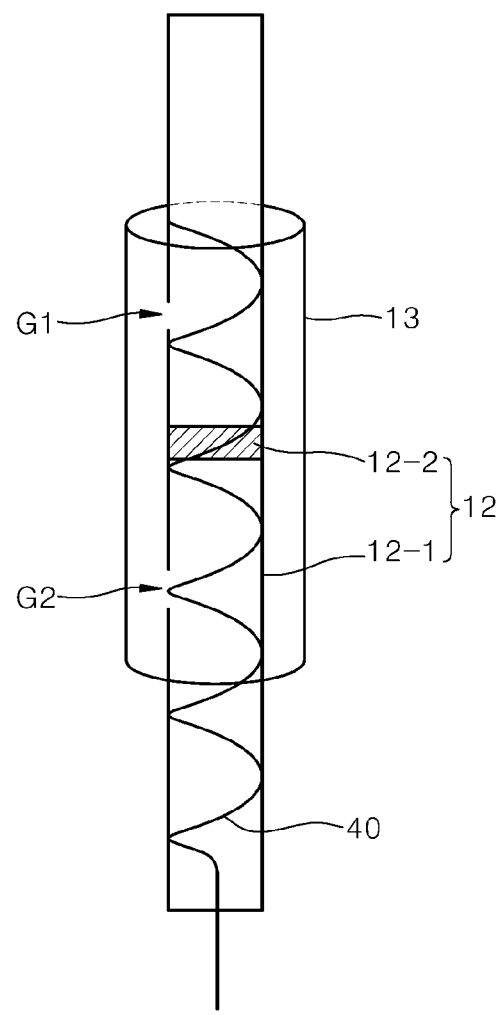
FIGS. 11 and 12 are diagrams for describing a coupling structure of the tubular type cell battery module according to the embodiment of the present disclosure.
Figure 12:
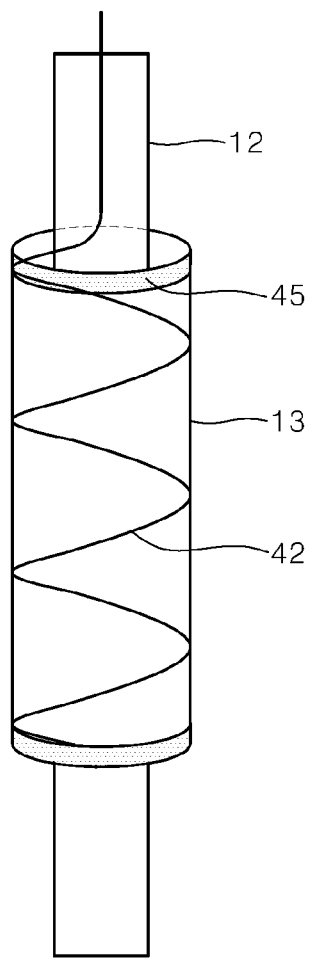

Meanwhile, FIGS. 11 and 12 are diagrams for describing a coupling structure of the tubular type cell battery module according to the embodiment of the present disclosure.

As shown in FIGS. 11 and 12, the tubular type cell battery module 10 in FIG. 9 according to the embodiment of the present disclosure may include the tubular type electrode stacked body 13, and the porous support tube 12 spaced apart from the tubular type electrode stacked body 13 at a predetermined interval and inserted into an inner center of the electrode stacked body 13.

At this point, the porous support tube 12 includes a tube body 12-1 having a hollow structure, a partition wall 12-2 disposed at a central portion of a hollow interior of the tube body 12-1, and first and second openings G1 and G2 configured to pass through some portion of the tube body 12-1 to upper and lower sides spaced apart from the partition wall 12-2, respectively. Accordingly, the porous support tube 12 has a structure in which a central portion is blocked by the partition wall 12-2, and the structure is partially opened by the first and second openings G1 and G2.

The electrode stacked body 13 is spaced apart from the porous support tube 12 at a predetermined interval, and both side edges of the electrode stacked body 13 are sealed by an inner sealing material 45 such that the electrode stacked body 13 is fixed to the porous support tube 12. Consequently, an interior of the electrode stacked body 13 has a sealed structure. As described above, since the edges of the electrode stacked body 13 are sealed with the inner sealing material 45, there is no concern in which fuel gas circulating into the hollow interior of the porous support tube 12 and the interior of the electrode stacked body 13 is not mixed with air circulating into a space between the electrode stacked body 13 and the outer tube 14 in FIG. 13.

As shown in FIGS. 9 and 12, the electrode stacked body 13 may have a structure in which the fuel electrode 13-1, the electrolyte layer 13-2, and the air electrode 13-3 are sequentially stacked. Accordingly, the fuel electrode 13-1 may be disposed on an inner surface of the electrode stacked body 13, and the air electrode 13-3 may be disposed on an outer surface of the electrode stacked body 13.

Further, the tubular type cell battery module 10 may further include a fuel electrode connection line 40 and an air electrode connection line 42. At this point, the fuel electrode connection line 40 is coiled on an outer circumferential surface of the porous support tube 12 to be electrically connected to the fuel electrode 13-1 of the electrode stacked body 13. Further, the air electrode connection line 42 is coiled on an outer circumferential surface of the electrode stacked body 13 to be electrically connected to the air electrode 13-3 of the electrode stacked body 13.

Figure 13:
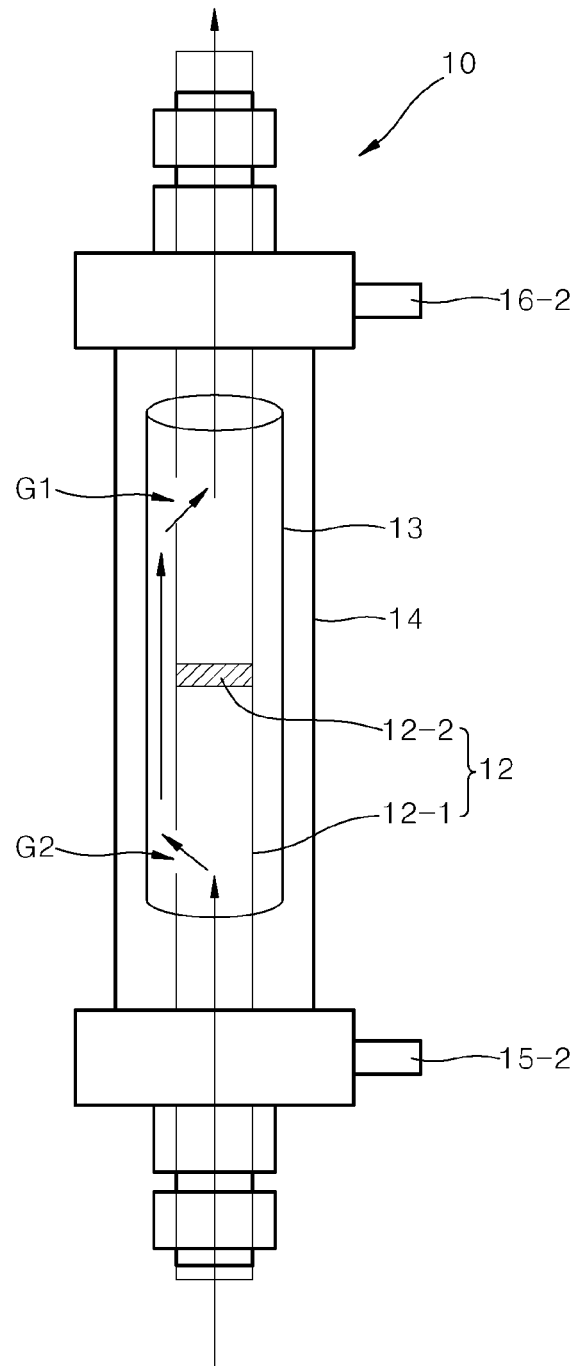
FIGS. 13 and 14 are diagrams for describing a gas flow path of the tubular type cell battery module according to the embodiment of the present disclosure.
Figure 14:
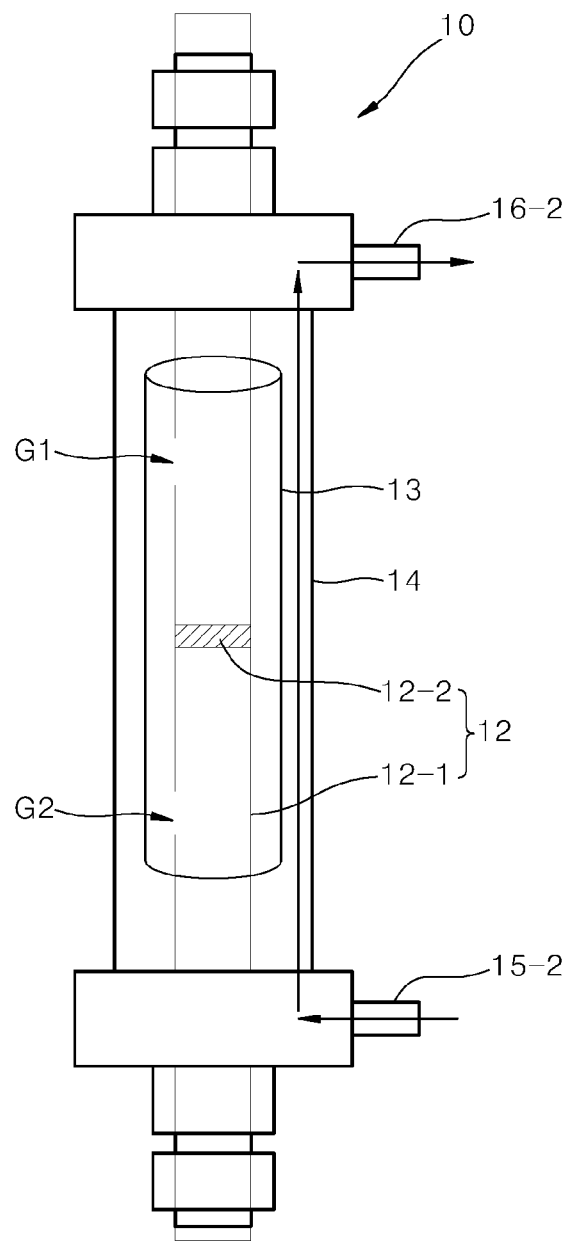

FIGS. 13 and 14 are diagrams for describing a gas flow path of the tubular type cell battery module according to the embodiment of the present disclosure. At this point, FIG. 13 shows a flow path of the fuel gas in the tubular type cell battery module, and FIG. 14 shows a flow path of the air in the tubular type cell battery module.

As shown in FIG. 13, when the fuel gas is first supplied to a hollow interior of a lower end of the tube body 12-1, a fuel gas flow in an upward direction is blocked by the partition wall 12-2 of the porous support tube 12, is diffused and supplied to a space between the porous support tube 12 and the electrode stacked body 13 by the second opening G2 disposed at a lower side spaced apart from the partition wall 12-2, and then is discharged to an upper end of the tube body 12-1 again through the first opening G1 disposed at an upper side spaced apart from the partition wall 12-2. Consequently, due to gas diffusion of the fuel gas flowing into the space between the porous support tube 12 and the electrode stacked body 13, the fuel electrode 13-1 in FIG. 9 disposed on the inner surface of the electrode stacked body 13 reacts with the fuel gas.

Meanwhile, as shown in FIG. 14, the air supplied through the air supply port 15-2 flows into the space between the electrode stacked body 13 and the outer tube 14 and moves to the upper side, and then is discharged to the outside through the air discharge port 16-2. Consequently, the air flowing into the space between the electrode stacked body 13 and the outer tube 14 reacts with the air electrode 13-3 in FIG. 9 disposed on the outer surface of the electrode stacked body 13.

In accordance with the stack module for a fuel cell and high temperature electrolysis according to the present disclosure, a plurality of cell battery modules are designed to be able to be individually separated, combined, or replaced by an one-touch manner during operation, so that maintenance costs of the stack module for a fuel cell and high temperature electrolysis is low, and, even when one or more cell battery modules are separated from a fuel transfer panel, the stack module for a fuel cell and high temperature electrolysis, which includes other cell battery modules, can operate normally such that superior power generation efficiency can be provided.

Further, in accordance with the stack module for a fuel cell and high temperature electrolysis according to the present disclosure, there is an effect in which, since a plurality of tubular type cell battery modules are individually electrically grounded to collect a current using a circuit built in the fuel transfer panel, the plurality of cell battery modules can be individually controlled and also current collection efficiency can be improved.

Furthermore, in accordance with the stack module for a fuel cell and high temperature electrolysis according to the present disclosure, heat emission can be minimized by installing a cell battery module housing individually covering the plurality of tubular type cell battery modules, and also the plurality of tubular type cell battery modules can be individually controlled by a heating wire provided therein such that energy efficiency can be maximized.

Although the present disclosure has been described in connection with the above-mentioned preferred embodiments, it should be understood that various variations and modifications can be devised without departing from the spirit and scope of the present disclosure. Accordingly, the appended claims will cover any such modifications and variations as fall within the gist of the present disclosure.

What is claimed is:

1. A stack module for a fuel cell and high temperature electrolysis, comprising:
a plurality of cell battery modules; and
a fuel transfer panel to which the plurality of cell battery modules are coupled,
wherein each of the plurality of cell battery modules includes a fuel supply port, an air supply port, a fuel discharge port, and an air discharge port,
the fuel transfer panel includes a fuel supply port, a fuel discharge port, an air supply port, and an air discharge port which are installed at an outer wall of the fuel transfer panel, and at an interior thereof, a fuel circulation pipe connected to the fuel supply port and the fuel discharge port of the fuel transfer panel, and an air circulation pipe connected to the air supply port and the air discharge port of the fuel transfer panel,
when each of the plurality of cell battery modules is coupled to the fuel transfer panel, the fuel supply port and the fuel discharge port of each of the plurality of the cell battery modules are coupled to the fuel circulation pipe to break a connection of the fuel circulation pipe and, simultaneously, to bridge the fuel circulation pipe that is disconnected, thereby allowing fuel to circulate through an interior of each of the plurality of cell battery modules, and at the same time, the air supply port and the air discharge port of each of the plurality of cell battery modules are connected to the air circulation pipe to break a connection of the air circulation pipe and, simultaneously, to bridge the air circulation pipe that is disconnected, thereby allowing air to circulate through the interior of each of the plurality of cell battery modules, and
when each of the plurality of cell battery modules is separated from the fuel transfer panel, the fuel circulation pipe and the air circulation pipe are restored.

2. A stack module for a fuel cell and high temperature electrolysis, comprising:
a plurality of cell battery modules; and
a fuel transfer panel provided with a plurality of cell battery module insertion recesses to which the plurality of cell battery modules are fixed,
wherein each of the plurality of cell battery modules includes, at one end portion thereof, a tubular type fixer configured to be insertable into and separable from each of the plurality of cell battery module insertion recesses of the fuel transfer panel, and having an outer wall at which a fuel supply port, an air supply port, a fuel discharge port, and an air discharge port are formed,
the fuel transfer panel includes a fuel supply port, a fuel discharge port, an air supply port, and an air discharge port which are provided at an outer wall of the fuel transfer panel,
each of the plurality of cell battery module insertion recesses formed inside the fuel transfer panel includes a fuel supply port, a fuel discharge port, an air supply port, and an air discharge port,
the fuel supply port and the air supply port of each of the cell battery module insertion recesses are communicated with the fuel discharge port and the air discharge port of one adjacent cell battery module insertion recess of the plurality of cell battery module insertion recesses by a fuel circulation pipe and an air circulation pipe, and the fuel discharge port and the air discharge port thereof are communicated with the fuel supply port and the air supply port of another adjacent cell battery module insertion recess of the plurality of cell battery module insertion recesses by the fuel circulation pipe and the air circulation pipe, the fuel supply port and the air supply port of one of the plurality of cell battery module insertion recesses of the fuel transfer panel are communicated with the fuel supply port and the air supply port of the outer wall of the fuel transfer panel by the fuel circulation pipe and the air circulation pipe, and the fuel discharge port and the air discharge port of another of the plurality of cell battery module insertion recesses are communicated with the fuel discharge port and the air discharge port of the outer wall of the fuel transfer panel by the fuel circulation pipe and the air circulation pipe, the fuel transfer panel comprises a pipe plate at each of the plurality of cell battery module insertion recesses, which includes two pipes configured to connect and communicate the fuel supply port to and with the fuel discharge port, and the air supply port to and with the air discharge port of the corresponding cell battery module insertion recess in a state in which the corresponding cell battery module is not inserted into the corresponding cell battery module insertion recess, and each of the pipe plates includes an elastic member, and thus, when each of the cell battery modules is inserted into the corresponding cell battery module insertion recess, the corresponding pipe plate is moved downward by a pressure, and, when the corresponding cell battery module is separated from the cell corresponding battery module insertion recess, the corresponding pipe plate is moved upward by an elastic force to connect and communicate the fuel supply port to and with the fuel discharge port, and the air supply port to and with the air discharge port of the corresponding cell battery module insertion recess.

3. The stack module of claim 2, wherein each of the cell battery modules is a tube type, and includes a tubular type electrode stacked body in which a fuel electrode, an electrolyte layer, and an air electrode are stacked in this order or in the reverse order.

4. The stack module of claim 3, wherein each of the tubular type cell battery modules further includes an outer tube accommodating the tubular type electrode stacked body therein.

5. The stack module of claim 4, wherein fuel gas is supplied to each of the tubular type cell battery modules through a center portion of the corresponding tubular type electrode stacked body, and air is supplied thereto through the corresponding outer tube.

6. The stack module of claim 4, wherein a heating wire is further provided outside or inside the outer tube.

7. The stack module of claim 4, wherein a thermocouple is further provided inside the outer tube or a fuel cell support tube.

8. The stack module of claim 4, wherein each of the tubular type cell battery modules further includes:

a first cap configured to cover one end portion of the corresponding tubular type electrode stacked body and outer tube, and provided with a fuel supply port and an air supply port;

a second cap configured to cover the other end portion of the corresponding tubular type electrode stacked body and outer tube and provided with a fuel discharge port and an air discharge port;

a fixing plate having one side to which the first cap is fixed and the other side to which the corresponding tubular type fixer is fixed; and a pipe portion including a first pipe configured to connect the fuel supply port of the first cap to a fuel supply port of the corresponding tubular type fixer, a second pipe configured to connect the air supply port of the first cap to an air supply port of the corresponding tubular type fixer, a third pipe configured to connect the fuel discharge port of the second cap to a fuel discharge port of the corresponding tubular type fixer, and a fourth pipe configured to connect the air discharge port of the second cap to an air discharge port of the corresponding tubular type fixer.

9. The stack module of claim 8, wherein the first to fourth pipes are connected by passing through the fixing plate.

10. The stack module of claim 8, wherein:

an electrical wiring connector is installed at the fixing plate to protrude from a side of the tubular type fixer to be insertable into and separable from the fuel transfer panel, an electrical wiring extending from the fuel electrode and an electrical wiring extending from the air electrode are connected to individual terminals of the electrical wiring connector, and an electrical wiring connector accommodation recess into which the electrical wiring connector is inserted is further provided at a side of each of the cell battery module insertion recesses of the fuel transfer panel.

11. The stack module of claim 8, wherein electrical wiring connector accommodation recesses inside the fuel transfer panel are connected to each other by an electrical wiring.

12. The stack module of claim 8, wherein a cell battery module housing capable of covering each of the plurality of cell battery modules is further provided at the fixing plate.

13. The stack module of claim 3, wherein each of the tubular type cell battery modules further includes a porous support tube inserted and disposed inside the corresponding tubular type electrode stacked body.

14. The stack module of claim 13, wherein the porous support tube includes:

a tube body having a hollow structure;

a partition wall disposed at a center portion of a hollow interior of the tube body; and first and second openings configured to pass through some portion of the tube body to an upper side and a lower side which are spaced apart from the partition wall.

15. The stack module of claim 13, wherein the porous support tube performs a function of current collector.

16. The stack module of claim 2, wherein:

a sealing member is further provided at the fuel supply port, the air supply port, the fuel discharge port, and the air discharge port which are formed at the outer wall of the tubular type fixer, and a sealing member is further provided at the fuel supply port, the fuel discharge port, the air supply port, and the air discharge port which are provided at the plurality of cell battery module insertion recesses formed inside the fuel transfer panel.

17. The stack module of claim 2, wherein the plurality of cell battery modules has various output density performances.

* * * * *